US005999982A

United States Patent [19]

Kishi et al.

[11] Patent Number: 5,999,982
[45] Date of Patent: Dec. 7, 1999

[54] AUTOMATED MESSAGE PROCESSING SYSTEM HAVING A PLURALITY OF EXPERT LOCAL FACILITIES RESPONSIVE TO MESSAGES ROUTED THERETO TO PERFORM PREDETERMINED ACTIONS

[75] Inventors: Gregory Tad Kishi, Oro Valley; David Lee Patterson, Tucson, both of Ariz.

[73] Assignee: International Business Machines Corporation, Armonk, N.Y.

[21] Appl. No.: 08/865,317

[22] Filed: May 29, 1997

[51] Int. Cl.$^6$ ................................................. G06F 13/00
[52] U.S. Cl. ................................................. 709/238
[58] Field of Search ................................. 395/821, 822, 395/823, 824, 825, 827, 835, 836, 837, 838, 839, 840, 800.28, 800.29, 800.3, 800.31, 800.32; 709/238

[56] References Cited

U.S. PATENT DOCUMENTS

| | | | |
|---|---|---|---|
| 4,467,421 | 8/1984 | White | 711/118 |
| 4,638,424 | 1/1987 | Beglin et al. | 711/117 |
| 4,755,928 | 7/1988 | Johnson et al. | 395/182.04 |
| 4,769,782 | 9/1988 | Iwanage | 711/111 |
| 5,088,026 | 2/1992 | Bozman et al. | 711/3 |
| 5,155,835 | 10/1992 | Belsan | 711/114 |
| 5,247,638 | 9/1993 | O'Brien et al. | 395/888 |
| 5,386,545 | 1/1995 | Gombos, Jr. et al. | 707/204 |
| 5,408,630 | 4/1995 | Moss | 711/112 |
| 5,410,697 | 4/1995 | Baird et al. | 711/152 |
| 5,491,810 | 2/1996 | Allen | 711/117 |
| 5,513,336 | 4/1996 | Vishlitzky et al. | 711/136 |
| 5,519,844 | 5/1996 | Stallmo | 711/114 |
| 5,537,568 | 7/1996 | Yanai et al. | 711/118 |
| 5,546,557 | 8/1996 | Allen et al. | 711/111 |
| 5,584,008 | 12/1996 | Shimada et al. | 711/114 |
| 5,598,528 | 1/1997 | Larson et al. | 395/182.05 |
| 5,613,154 | 3/1997 | Burke et al. | 395/821 |
| 5,805,864 | 9/1998 | Carlson et al. | 395/821 |
| 5,809,511 | 9/1998 | Peake | 707/204 |

OTHER PUBLICATIONS

*IBM Technical Disclosure Bulletin*, vol. 37, No. 06A, Jun. 1994, "High Capacity DASD Dual–Copy Secondary to Multiple 3390 Primary Devices", pp. 493–497.

U.S. Patent Application No. 08/778,118, Filed Jan. 2, 1997, entitled "Outboard Data Migration in a Volume Stacking Library", in the names of J. W. Peake et al.

U.S. Patent Application No. 08/707,891, Filed Sep. 10, 1996, entitled "Virtual Integrated Cartridge Loader for Virtual Tape Storage System", in the names of Carlson et al.

"Multitasking Volume Backup in a Space Management Program", T. W. Beglin, *IBM Technical Disclosure Bulletin*, vol. 24, No. 5, Oct. 1981, pp. 2418–2419.

"Minimizing Storage Device Contention in a Multi–Host, Multi–Tasking Environment", *IBM Technical Disclosure Bulletin*, vol. 35, No. 1A, Jun. 1992, pp. 170–173.

(List continued on next page.)

Primary Examiner—Moustafa M. Meky
Attorney, Agent, or Firm—Gray Cary Ware Freidenrich

[57] ABSTRACT

An automated message processing system communicates with a digital data processing machine, for example, in replacement of a human operator. The automated message processing system receives messages from a digital data processing machine. The received messages may include immediate-response messages as well as delayed-response messages. Each received message is selectively routed to one of many specialized expert local facilities (ELF) for performance of a designated function, such as generation of an appropriate output message. Each ELF may also generate output messages in response to other stimulus, such as expiration of a timer or receipt of a message from another ELF or an external source. The output message is formatted appropriately and ultimately transmitted to the digital data processing machine.

47 Claims, 4 Drawing Sheets

OTHER PUBLICATIONS

"Logical Grouping of Data Storage Media in a Library System", *IBM Technical Disclosure Bulletin*, vol. 35, No. 5, Oct. 1992, pp. 17–20.

"Scratch Tape Drive Allocation Algorithm for Multiple Tape Libraries", *IBM Technical Disclosure Bulletin*, vol. 36, No. 11, Nov. 1993, pp. 249–251.

"Requesting Operator to Preload Integrated Cartridge Loader in Managed Manual Mode Library", *IBM Technical Disclosure Bulletin*, vol. 39, No. 04, Apr. 1996, p. 271.

"Automatic Cartridge Facility Usage in a 3495 Library", *IBM Technical Disclosure Bulletin*, vol. 39, No. 10, Oct. 1996, pp. 55–56.

AUTOMATED MESSAGE PROCESSING SYSTEM HAVING A PLURALITY OF EXPERT LOCAL FACILITIES RESPONSIVE TO MESSAGES ROUTED THERETO TO PERFORM PREDETERMINED ACTIONS

BACKGROUND OF THE INVENTION

1. Field of the Invention

The present invention relates to a system that processes and responds to messages generated by a digital data processing machine. More particularly, the invention concerns an apparatus, article of manufacture, and method for receiving both immediate-response and delayed-response messages from a digital data processing machine, selectively routing the messages to specialized expert local facilities (ELFs), performing designated functions at the ELFs, generating an appropriate output message, and transmitting the output message to the digital data processing machine.

2. Description of the Related Art

Many different machines require operator supervision. Although automation is increasing, some type of management by an operator is still required for many simple machines such as drill presses, facsimile machines, and sewing machines. With more complicated machines, an operator is even more important, to perform critical and often complicated duties.

For example, most mass data storage systems require some type of operator support. Such data storage systems often store customer data on magnetic tapes, magnetic disk drives, or a combination of the two. These systems need an operator to perform error/exception handling, to backup data, to configure hardware devices, and to perform other functions. Furthermore, in storage libraries employing portable data storage units, such as tapes, operators must manage the media pool. This involves, for instance, supplying blank media, labelling tapes, advising the system when new tapes are introduced, and the like.

Thus, the operator provides the mass storage system with a number of benefits. On the other hand, use of an operator also comes with a number of drawbacks. One drawback, for example, is the cost of paying a highly trained person to monitor the data storage system. It may even be necessary to have an operator at hand twenty-four hours a day in systems that store particularly important data, such as automated teller machines, telephone directory information, internationally accessible data, and the like. In these systems, the cost of the operator can be substantial.

Another drawback of human operators is the potential for human mistakes. And, with human operators comes the possibility of human work scheduling problems. The operator's absence from the data storage system at a critical time may have serious consequences. For example, recovery from certain types of system errors may be impossible without operator intervention, thus rendering the entire storage system inoperative.

SUMMARY OF THE INVENTION

Broadly, the present invention concerns an automated message processing system for communicating with a digital data processing machine. In short, the automated message processing system receives messages from a digital data processing machine, selectively routes each message to one of many specialized ELFs for performance of a designated function and generation of an appropriate output message, and ultimately transmits the output message to the digital data processing machine. The automated message processing system may be implemented, for example, by programming a computer.

As a more detailed example, the automated message processing system includes a sorting and transmitting administrator (SANTA) coupled to a digital data processing machine to receive messages therefrom. The SANTA selectively routes each message to one of a plurality of expert local facilities (ELFs) according to the content of the received message. The messages include, for example, immediate-response messages and delayed-response messages. The SANTA includes a command response unit coupled to the digital data processing machine, which receives immediate-response messages from the digital data processing machine and routes each immediate-response message to an appropriate one of the ELFs in response to routing criteria received at a routing input. The SANTA also includes a message console coupled to the digital data processing machine to receive delayed-response messages and route all delayed-response message to a predetermined one of the ELFs.

Each of the plurality of ELFs includes one or more inputs each coupled to the command response unit, the message console, or an activating source such as a timer, an external source, or another ELF. Each ELF "activates" in response to "stimuli" signals, responsively performing certain predetermined functions. These functions include generating an output message, and may also include processing of messages received from the SANTA.

The automated message processing system also includes a command generator coupled to the ELFs and the routing input of the command response unit. The command generator generates routing criteria specifying which of the ELFs to route each received immediate-response message, and forwards the routing criteria to the routing input. The command generator also receives output messages from the ELFs and creates formatted output messages by conforming the received output messages into a predetermined format. Furthermore, the command generator selects a destination in the digital data processing machine for each formatted output message, and appropriately dispatches the formatted output message to the selected destination.

In one embodiment, the invention may be implemented to provide a method for communicating with a digital data processing machine. In contrast, another embodiment of the invention may be implemented to provide an apparatus such as an automated message processing system. In still another embodiment, the invention may be implemented to provide signal-bearing media tangibly embodying a program of machine-readable instructions executable by a digital data processing apparatus to perform method steps for communicating with a digital data processing system.

The invention affords its users with a number of distinct advantages. Chiefly, the invention facilitates automated processing of messages generated by a digital computer, in replacement of a human operator. Thus, in a mass storage system, the invention is especially advantageous because it avoids the cost of paying a highly trained person to monitor the data storage system, avoids the possibility of human errors, and guarantees nonstop mechanized supervision of the system. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Functional Components & Interrelationships

Figure 1:
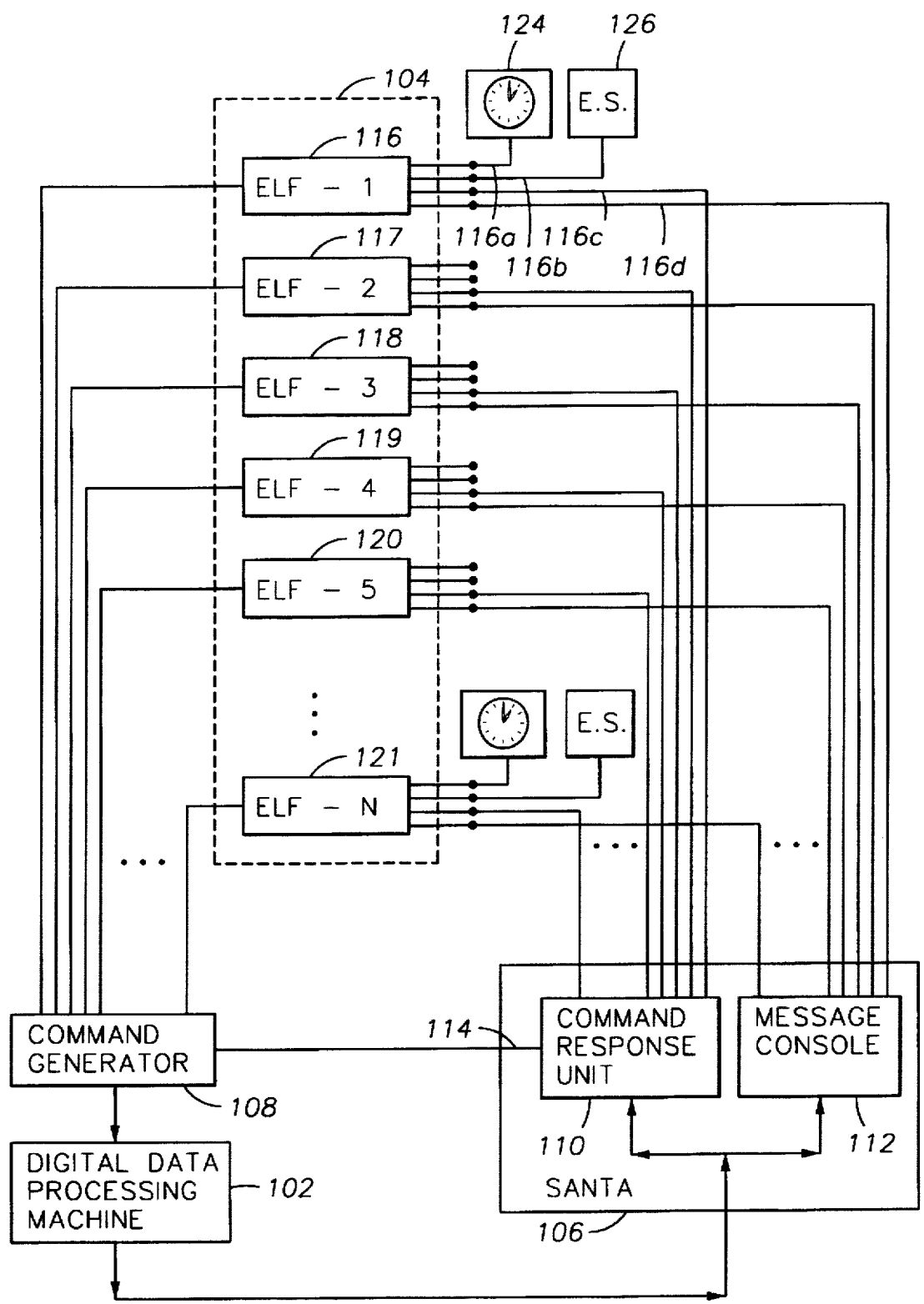
FIG. 1 is a block diagram showing functional components of an automated message processing system according to the invention.

One aspect of the invention concerns an automated message processing system, which may be embodied by various functional components and interrelationships. An example is given by the automated message processing system 100 of FIG. 1. As described in greater detail below, the components of the system 100 may be implemented with software functions, hardware devices, or a combination of both, depending upon the specific needs of the application.

Broadly, the automated message processing system 100 serves to communicate with a digital data processing machine 102. The automated message processing system 100 receives messages from the digital data processing machine 102, selectively routes each message to one of many specialized expert local facilities (ELFs) 104 for performance of a designated function and generation of an appropriate output message, and ultimately transmits the output message to the digital data processing machine 102.

Sorting and Transmitting Administrator (SANTA)

The system 100 includes a SANTA 106, which is coupled to the ELFs 104, the digital data processing machine 102, and a command generator 108. The SANTA 106, which may also be referred to as a "message director", includes a command response unit 110 and a message console 112. In the illustrated embodiment, the command response unit 110 and message console 112 are coupled to multiple ELFs 104. Generally, the SANTA 106 orchestrates forwarding of messages received from the digital data processing machine 102 to the appropriate one of the ELFs 104.

As explained in greater detail below, the SANTA 106 receives messages from the digital data processing machine 102, these messages include immediate-response messages and delayed-response messages. As known by those of ordinary skill, "immediate-response" messages are received by a processor in response to an output of that processor, while the processor is specifically waiting for that message before proceeding. In the illustrated example, after the command generator 108 sends a message to the digital data processing machine 102, the system 100 waits for the SANTA 106 to receive an immediate-response message from the machine 102, as discussed in greater detail below.

"Delayed-response" messages are also received by a processor in response to an output of that processor, however the processor does not wait for that message after sending the original output. In the illustrated example, the command generator 108 sends a message to the digital data processing machine 102, then proceeds to other operations. At some later time, the SANTA 106 eventually receives the delayed-response message. In the mean time, the command generator 108 has been performing other tasks.

The command response unit 110 routes each immediate-response message to one of the ELFs 104 according to routing criteria received at a routing input 114. The message console 112 receives all delayed-response messages from the digital data processing machine 102, routing these messages to an appropriate one of the ELFs 104 according to the content of the delayed-response message.

Although not shown, the SANTA 106 may also include message queues for buffering messages to the ELFs 104.

Expert Local Facilities (ELFs)

As mentioned above, the system 100 includes a plurality of ELFs 104, each of which performs a limited and particular function called an "expert" function. As explained more thoroughly below, each expert function involves the processing of a number of specific input messages compatible with that ELF, where each message is processed by applying a predetermined processing routine particular to that message. Although other tasks may also be included, each processing routine results in generation of an output message, which is ultimately directed to the command generator 108. Although more than one ELF may perform a given function, preferably each ELF performs a unique function with respect to the other ELFs.

Each ELF includes one or more inputs for receiving messages and stimuli. Each input is coupled to the command response unit 110, the message console 112, a timer, or an external source. For example, in the case of the ELF 116, a first input 116a is coupled to a timer 124, a second input 116b is coupled to an external source 126, a third input 116d is coupled to the message console 112, and a fourth input 116c is coupled to the command response unit 110. The external source 126 may comprise a component external to the system 100, or even another ELF.

As discussed in greater detail below, an ELF "activates" in response to a stimulus signal received on the inputs, performing certain appropriate predetermined actions accordingly. These actions include generation of an output message, which is directed to the command generator 108 as discussed in greater detail below.

In an alternative embodiment, the SANTA 106 may be coupled to one or more external sources, permitting the ELFs to additionally receive external stimuli via the SANTA 106 rather than a directly coupled external source such as 126.

Command Generator

Coupled to each ELF 104, the command generator 108 receives output messages generated by the ELFs 104. The command generator 108 places these output messages in a predetermined format compatible with the digital data processing machine 102. The command generator 108 also selects a destination in the digital data processing machine 102 for sending each formatted output message, and ultimately dispatches the formatted output message to that destination. This may be achieved, for example, by selecting an appropriate component and/or address of the machine 102, and sending the formatted output message to that component and/or address.

In addition to the ELFs 104, the command generator 108 is also coupled to the routing input 114 of the command response unit 110. The command generator 108 generates routing criteria specifying one or more ELFs 104 for the command response unit 110 to route each immediate-response message received by the unit 110 from the machine 102. The command generator 108 forwards the routing criteria to the command response unit 110.

As an example, the routing criteria may identify an incoming message identification code, a time window when the message is expected, or another characteristic of the window. As an alternative, the routing criteria may comprise a file or linked list or a group of messages identified by the first and/or last message in the group.

Implementation of Automated Message Processing System: One Example

The automated message processing system 100 may implemented in a number of different ways, depending upon the specific needs of the application. As an example, the components of FIG. 1 may be implemented using discrete circuitry, application-specific integrated circuitry, programmable circuit components, logic circuitry, or a combination.

As another alternative, some of the features of the system 100 may be implemented in software, while others are implemented using suitable hardware.

Figure 2:
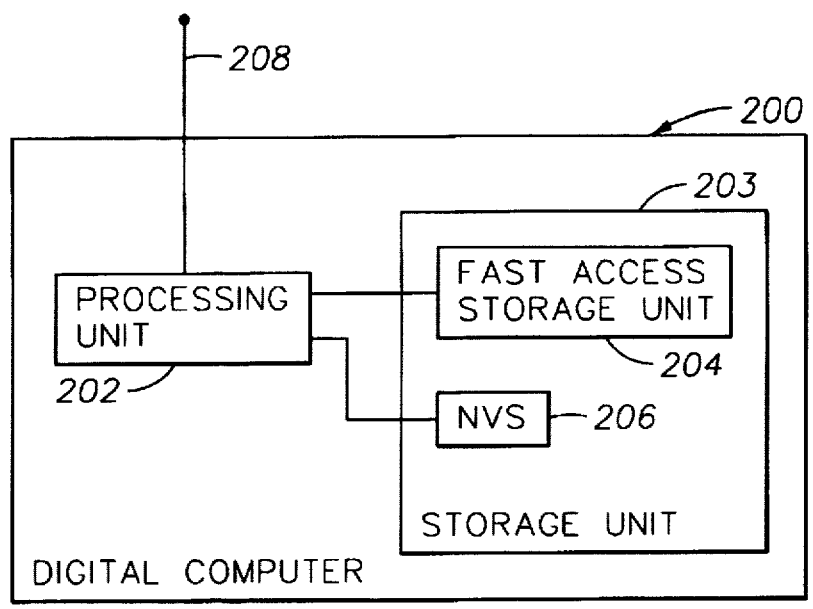
FIG. 2 is an illustrative hardware implementation of the automated message processing system of the invention.

In the preferred embodiment, however, the system 100 is implemented in software, by using a digital computer to execute a sequence of programming instructions. In this embodiment, then, the components of FIG. 1 are software modules or functional units, rather than physical hardware components. This embodiment may therefore be implemented using a digital computer, as shown in FIG. 2.

The computer 200 includes a processing unit 202, such as a microprocessor or other processing machine, coupled to a storage unit 203. In the present example, the storage unit 203 includes a fast-access storage unit 204 and a nonvolatile storage unit 206. The fast-access storage unit 204 preferably comprises random access memory, and may be used to store the programming instructions executed by the processing unit 202 during such execution. The nonvolatile storage unit 206 may comprise, for example, one or more magnetic data storage disks such as a "hard drive", a tape drive, or any other suitable storage device. The computer 200 also includes an input/output 208, such as a line, bus, cable, electromagnetic link, or other means for exchanging data with the processing unit 202.

Despite the specific foregoing description, ordinarily skilled artisans (having the benefit of this disclosure) will recognize that the system 100 may be still implemented in a computer of different construction, without departing from the scope of the invention. As a specific example, one of the storage units 204/206 may be eliminated; furthermore, the processing unit 202 may be provided with on-board storage, even though the storage unit 203 is shown separate from the processing unit 202. Moreover, some or all of the components 202/204/206 may be shared by other hardware devices (not shown) such as the digital data processing machine 102.

Application of the Automated Message Processing System: One Example

As one particularly useful application of the system 100, the system 100 may be used in a mass storage subsystem to serve as an automated system administrator, in substitution for a human storage administrator. In this embodiment, the storage subsystem constitutes the digital data storage apparatus 102 that exchanges messages with the automated message processing system 100.

Figure 3:
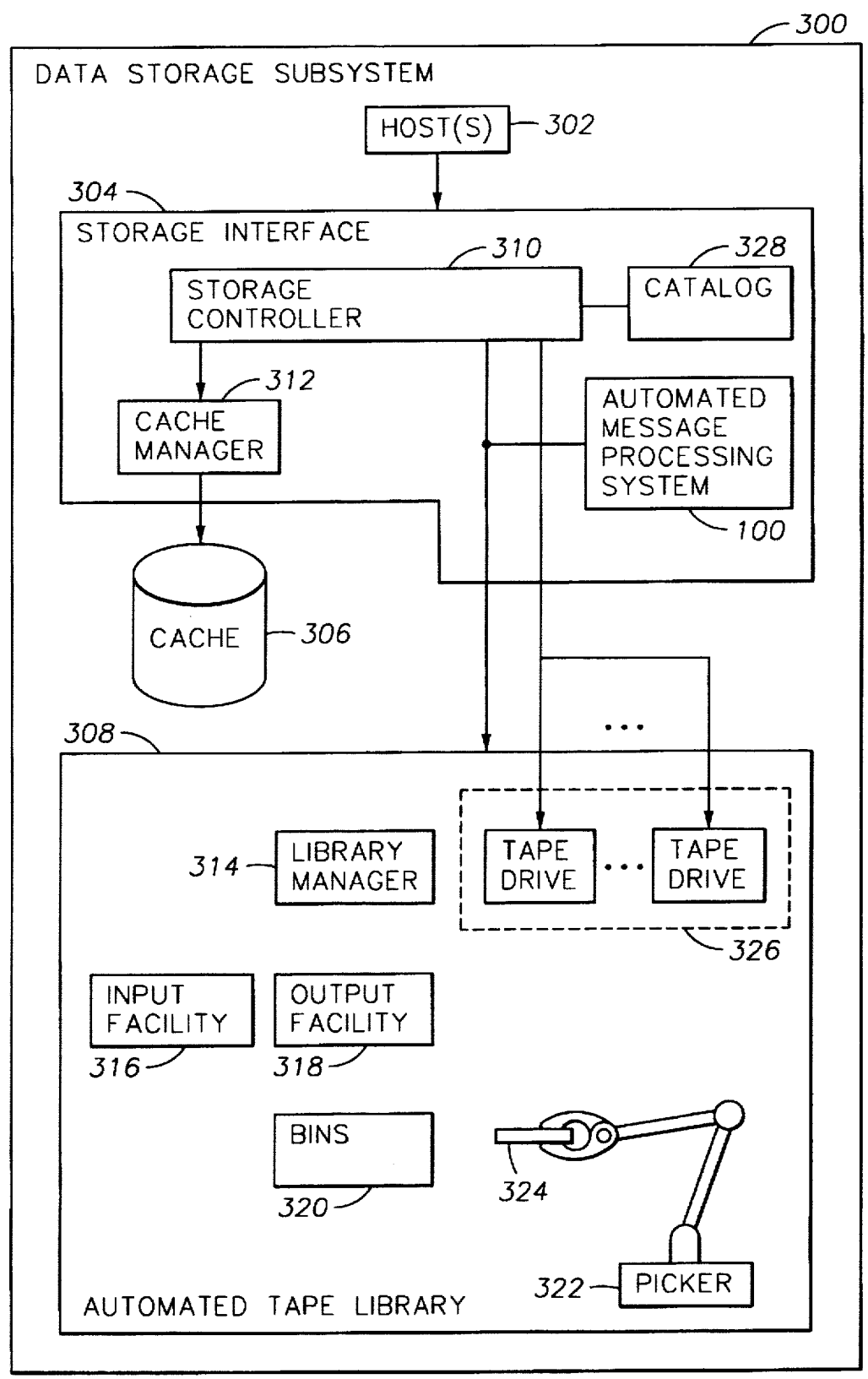
FIG. 3 is a specific hardware implementation using the automated message processing system of the invention as an automated system administrator for a mass data storage subsystem.

FIG. 3 depicts an example of a data storage subsystem 300, and its hardware components and interconnections. The subsystem 300 includes one or more hosts 302, a storage interface 304, and an automated tape library 308. Optionally, for reasons explained below, the subsystem 300 may also include a cache 306. In the illustrated embodiment, the automated message processing system 100 is implemented within a storage interface 304, where it is coupled to a storage controller 310 and the tape library 308.

Broadly, the hosts 302 comprises one or more units that utilize data stored on the cache 306 and library 308. The storage interface 304 exchanges data between the hosts 302 and the cache 306, and between the hosts 302 and the library 308. These exchanges are conducted in accordance with commands from the host 302. The storage interface 304 also oversees data transfers from the cache 306 to the library 308 (e.g., "destaging" operations) and data transfers from the library 308 to the cache 306 (e.g., "staging" operations due to cache misses).

The automated tape library 308 is an apparatus that manages the storage, loading, unloading, movement, writing, and reading of tape cartridges ("tapes"), such as the tape 324. The tapes 324 are stored in bins 320. A picker 322, such as robotic arm, selectively collects tapes 324 from an input facility 316, carries tapes to an output facility 318, and exchanges tapes as required with tape drives 326. The input facility 316, for example, may include one or more tape storage slots along with a batch loading mechanism (not shown) for receiving tapes from an operator. Similarly, the output facility 318 may include one or more tape storage slots along with a batch output mechanism (not shown) for transferring tapes from the library 308 to an operator.

The tape library 308 may comprise a new design, or a conventional tape library. As an example, the tape library 308 may comprise an IBM model 3494 tape library with at least (1) an IBM 3490 model C2A tape drive to access the following types of tapes: the IBM CST tape (standard cartridge system tape, 18 or 36 track format), and the IBM ECCST tape (enhanced capacity cartridge system tape, 36 track format), and (2) an IBM 3590 model B2A tape drive to access the IBM HPCT tape (high performance cartridge tape, 128 track format). The library 308 also includes a tape library manager 314, which oversees operations of the library 308, and may comprise a new design or a conventional manager for the specific configuration embodied by the library 308. In the illustrated example, the tape library manager 314 may comprise the library manager used in the IBM model 3494 library.

Turning to the components of the storage interface 304, the cache 306, an optional component, may be included in the subsystem 300 to provide a fast-access data storage location. As discussed in greater detail below, newly received data may be first stored in the cache 306, and then or migrated to the tape library 308 upon satisfaction of some criteria, such as a period or level of non-use. In an illustrative embodiment, the cache 306 may comprise a magnetic disk storage device such as a high data capacity "hard drive."

The storage interface 304 includes a storage controller 310, a cache manager 312, and a catalog 328. The cache manager 312 oversees operations of the cache 306, and may comprise a new design or a conventional manager for the type of data storage device embodied by the cache 306. In the illustrated example, the cache manager 312 may comprise a disk drive controller. The catalog 328 is used by the storage controller 310 to maintain information about the location of the data stored within the data storage subsystem 300.

The storage controller 310 directs operations of the managers 312/314 and also moves data to/from the tape drives 326. The storage controller 310 receives commands and data from the hosts 302, and issues appropriate commands to direct the managers 312/314 to take the necessary actions to execute the hosts' commands. The storage controller 310 may comprise a digital processing apparatus such as a microprocessor, personal computer, or more advanced processing machine.

In an exemplary implementation, the hosts 302 may be embodied by a variety of types and numbers of units, such as: mainframe or personal computers; workstations; user consoles such as keyboards, terminals, or other input devices; application programs; etc. Also as an example, the storage interface 304 may be implemented by executing appropriate software programming with a processing unit such as a IBM model RS6000 RISC microprocessor. The storage interface 304 and cache 306 may be embodied, for example, in an IBM model 3494 B16 virtual tape server. In one exemplary embodiment, the automated tape library 308 may comprise an IBM model 3494 tape library.

In environment of the foregoing embodiment, external sources such as the external source 126 may comprise the library manager 314, a user console (not shown) coupled to the storage interface 304 or library 308, a customer engineer service panel, a connection to another ELF, or another suitable source.

If desired, the invention may be implemented in the foregoing embodiment of data storage subsystem 300 to provide a virtual tape storage (VTS) system. VTS systems chiefly store data on tape, taking advantage of this inexpensive means of long term data storage. However, to expedite data exchanges, data is cached in a DASD cache, which may be embodied in the cache 306. According to a predetermined criteria, such as the data's age or recency/frequency of use, the data is backed up on tape, e.g. the tape library 308. Cache misses result in older data being retrieved from tape and stored again in the DASD cache.

Additional information about VTSs, some of which are well known in the art, is provided by the following references: (1) U.S. Pat. No. 4,467,421, entitled "Virtual Storage System & Methods", issued Aug. 21, 1984, (2) U.S. patent application Ser. No. 08/707,891, entitled "Virtual Integrated Cartridge Loader for Virtual Tape Storage System", filed on Sep. 10, 1996 in the names of Carlson et al, now U.S. Pat. No. 5,805,864, and (3) U.S. patent application Ser. No. 08/778,118, entitled "Outboard Data Migration in a Volume Stacking Library", filed on Jan. 2, 1997, in the name of J. W. Peake, now U.S. Pat. No. 5,809,511. The contents of the foregoing references are incorporated by reference.

Operation

In addition to the various hardware embodiments described above, a different aspect of the invention concerns a method for communicating with a digital data processing machine.

Signal-Bearing Media

Such a method may be implemented, for example, by operating an appropriate processing unit, such as the computer 200 (FIG. 2) or the storage interface 304 (FIG. 3), to execute a sequence of machine-readable instructions. These instructions may reside in various types of signal-bearing media. In this respect, one aspect of the present invention concerns a signal-bearing media tangibly embodying a program of machine-readable instructions executable by a digital data processor to perform a method to communicate with a digital data processing machine.

Figure 4:
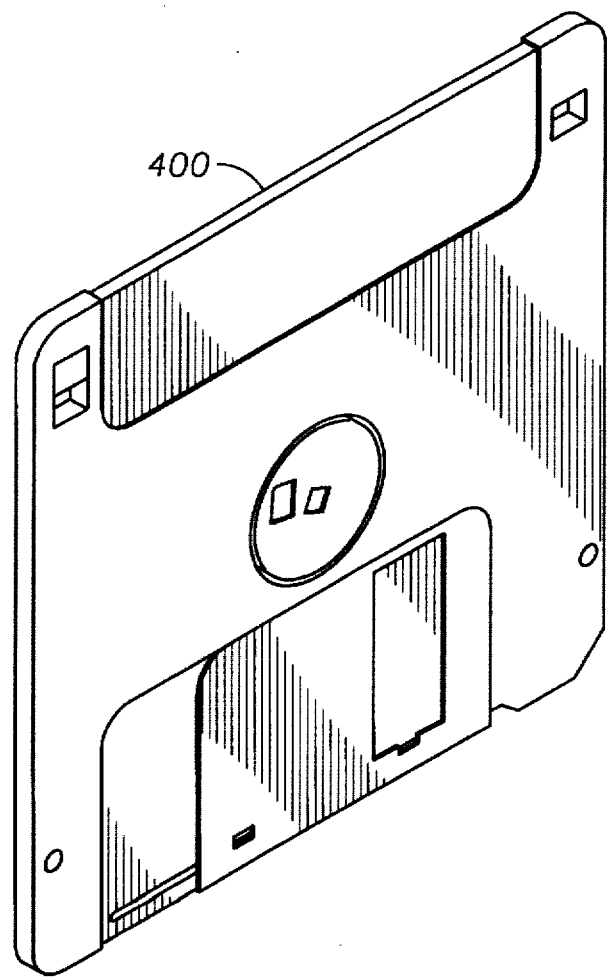
FIG. 4 is an exemplary signal-bearing medium according to the invention.

This signal-bearing media may comprise, for example, RAM embodied by the fast-access storage unit 204, or some memory accessible by the storage interface 304. Alternatively, the instructions may be contained in another signal-bearing media, such as a magnetic data storage diskette 400 (FIG. 4). Whether contained in the diskette 400, fast-access storage unit 204, storage interface 304, or elsewhere, the instructions may instead be stored on another type of data storage medium such as DASD storage (e.g., a conventional "hard drive" or a RAID array), magnetic tape, electronic read-only memory (e.g., CD-ROM or WORM), an optical storage device (e.g. WORM), paper "punch" cards, or other suitable signal-bearing media including transmission media such as digital and analog and communication links and wireless. In an illustrative embodiment of the invention, the machine-readable instructions may comprise lines of compiled "C" language code.

Overall Sequence of Operation

Figure 5:
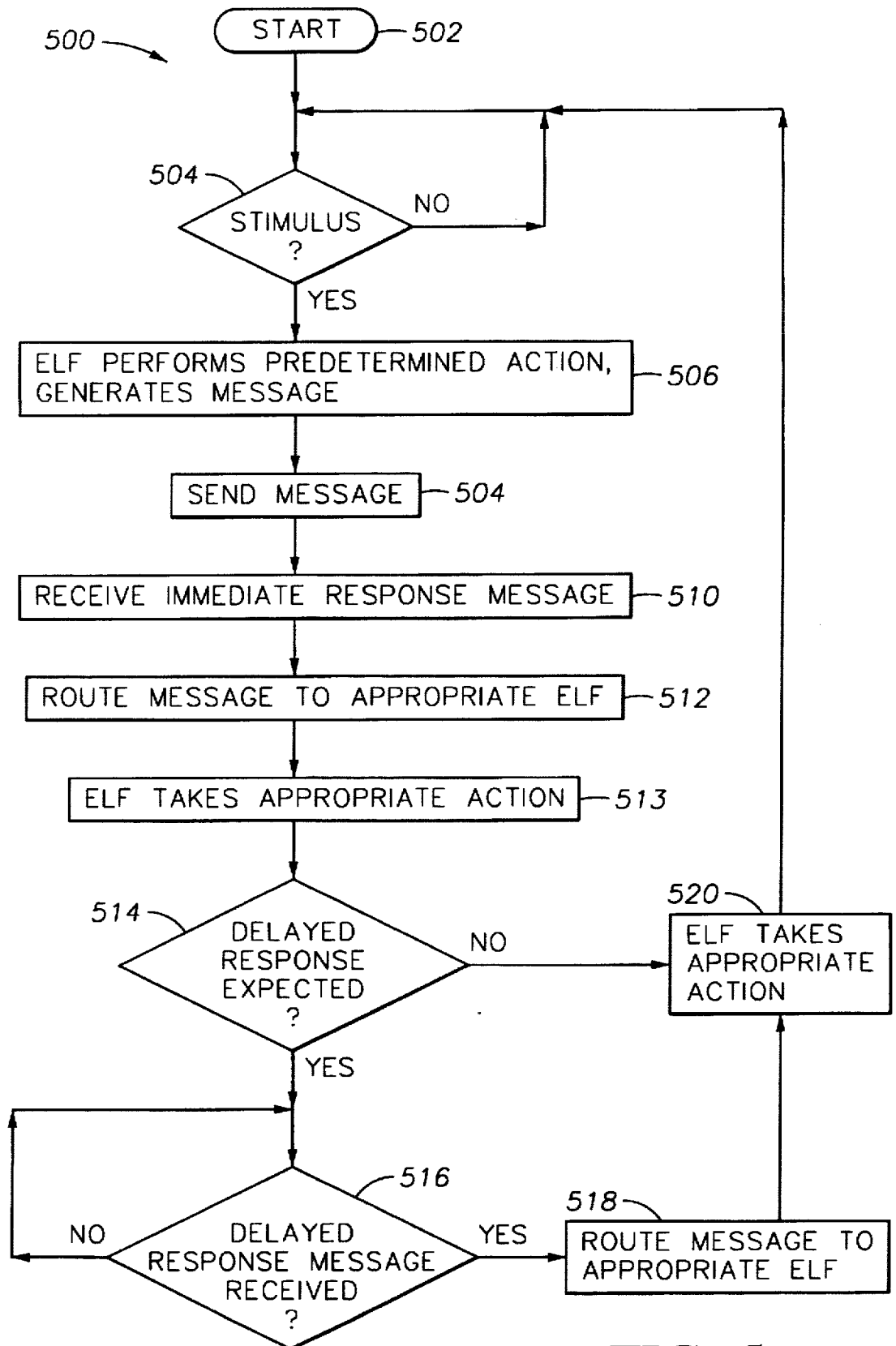
FIG. 5 is a flowchart depicting an illustrative operational sequence according to the invention.

FIG. 5 shows a sequence of method steps 500 to illustrate one example of the method aspect of the present invention. For ease of explanation, but without any limitation intended thereby, the example of FIG. 5 is described in the context of the automated message processing system 100 described above. FIG. 5 depicts task processing by the ELF 116, although these steps are similarly applicable to task processing in the other ELFs 117–121. For ease of illustration, the routine 500 depicts the full completion of a single task, in which the ELF 116 initiates action in response to an initiating stimulus, and performs subsequent follow-up in accordance with immediate-response and delayed-response messages.

After the steps are initiated in step 502, step 504 asks whether the ELF 116 has received an initiating stimulus. As shown below, an initiating stimulus triggers the ELF 116 to originate some action. The initiating stimulus contrasts with immediate-response and delayed-response messages, which are received by the ELF 116 during subsequent processing of an already-initiated task.

Initiating stimulus may be received at any of the inputs 116a–116d. Thus, the stimulus may comprise a timing event received from the timer 124, a signal from the external source 126, or a message from the digital data processing machine forwarded via the message console 112. Initiating stimuli may also be received from another ELF, in various ways. For instance, a second ELF may generate an initiating message and transmit back around to the first ELF, via the command generator 108, machine 102, and SANTA 106. Or, the second ELF may constitute an external source (such as 126), in which case the second ELF sends the stimulus directly to the first ELF.

If stimulus has been received, step 504 advances to step 506, where the ELF 116 (receiving the stimulus) performs a predetermined action, which includes generation of an appropriate message in response to the stimulus. Each of the ELFs 104 is programmed to recognize certain types of stimuli, and perform one or more specific actions in response to each stimulus. Some specific examples of messages generated by the ELFs 104 are described in detail below.

After the ELF 116 generates the message, the message is sent in step 508. First, the ELF 116 passes the message to the command generator 108. Then, the command generator 108 places the message in a predetermined format, such as a specific format compatible with the digital data processing machine 102. Then (also in step 508), the command generator 108 dispatches the formatted message to an appropriate destination in the digital data processing machine 102. Preferably, the desired destination is identified by the message output by the ELF 116. Alternatively, the command generator 108 may choose the destination based upon the content of the ELF's output message. The command generator 108 may dispatch the message, for example, by transmitting the formatted message to a particular address in the digital data processing machine 102, where this address corresponds to the selected destination for the message.

In the present example, the formatted output message sent in step 508 requires a response before the system 100 can proceed. Thus, after dispatching the formatted output message, the system 100 waits for an immediate-response message. This occurs in step 510, where the SANTA 106 receives an immediate-response message, generated (not shown) by the digital data processing machine 102. More specifically, the command response unit 110 is the component that actually receives the immediate-response message.

Having received the necessary immediate-response message, the command response unit 110 in step 512 routes the message to an appropriate one of the ELFs 102, preferably the same ELF that initiated action in step 506. Then, in step 513, this ELF takes appropriate action (if any) in response to the immediate-response message. Next, step 514 asks whether the message sent in step 508 is the type where a delayed-response message is expected. If not, the ELF receiving the immediate-response message in step 512 takes appropriate action (if any) in step 520.

If step 514 expects a delayed-response message, however, step 516 waits until the expected delayed-response message is actually received. Then, after step 516, the message console 112 in step 518 routes the delayed-response message to an appropriate one of the ELFs 104. This routing is performed based on the content of the message. Following step 518, the ELF receiving the message takes appropriate action in step 520. Step 520 may involve doing nothing, performing a computation, invoking another process, or any other appropriate action. Furthermore, step 520 may involve generating another message, in which case, control is effectively returned to step 506.

After step 520, control returns to step 504, where the routine 500 starts over.

Implementation in Data Storage Environment

As mentioned above, one particularly advantageous application of the invention implements the system 100 as an automated system administrator, in substitution for a human storage administrator, in a mass storage subsystem. Considering this embodiment, the routine 500 may be embellished in several respects. Without any limitation thereby, the examples below are explained in the context of the data storage subsystem 300 of FIG. 3.

Received Messages

In the data storage embodiment, the digital data processing machine 102 may be provided by the storage interface 304 and the automated tape library 308, as mentioned above. In this example, the messages received by the SANTA 106 comprise ASCII messages normally sent by an IBM model 3494 B16 Virtual Tape Server (the storage interface 304) or an IBM model 3494 Tape Library (the tape library 308) to a human system administrator. Some examples of these messages are shown in Table 1, where "NNNN" represents a numerical code.

ANSNNNN STORAGE POOL UPDATED

BACKGROUND PROCESS NNNN STARTED

BACKGROUND PROCESS NNNN FAILED

BACKGROUND PROCESS NNNN SUCCEEDED

ANSNNNN DEVICE CLASS UPDATED

Table 1

Exemplary Sequences

To further explain the operation of the system 100 in a mass storage system, a number of ELFs and their operation are discussed as follows.

Reclamation

As an example, one or more ELFs may be implemented to perform a "reclamation" function, which consolidates data by removing valid data from a specified tape and copying the data to another tape, leaving only expired data on the original tape. In this embodiment, the ELF 116 in step 504 detects a stimulus comprising a message from the timer 124. This stimulus is received on the input 116a of the ELF 116. In this example, the timer 124 issues a "ENABLE RECLAMATION" message.

In response to the stimulus, the ELF 116 in step 506 generates an output message such as "UPDATE STORAGE POOL RECLAMATION=90%". The command generator 108 sends the message to the storage controller 310 in step 508. Then, in step 510, the SANTA 106 receives an immediate-response message from the storage controller 310. In this example, the immediate-response message may be "ANSNNNN STORAGE POOL UPDATED", where "NNNN" refers to an error message number from the data storage subsystem 300. This being an immediate-response message, the command response unit 110 in step 512 routes the received message to the appropriate ELF, preferably the same ELF 116 that originated the procedure in step 506.

Following step 512, the ELF 116 in step 513 recognizes that no further action is required, and does nothing. Then, in step 514 the ELF 116 recognizes that a delayed-response message is also not expected in this case, and routes control to step 520. In step 520, the ELF recognizes that the storage pool has been updated as requested, and takes no action. In this case, "no action" is the appropriate action, since the task has completed successfully.

Check-In

In another example, one or more ELFs may be implemented to perform a media volume check-in function, which receives a new tape into the library 308. In this embodiment, the ELF 116 in step 504 detects a stimulus comprising a message from an external source 126, which in this case in another ELF. This stimulus is received on the input 116b of the ELF. In this example, the source 126 issues a "CHECK-IN LIBRARY VOLUME NNNN AS SCRATCH" message, which asks the system 100 to introduce a new volume of media into the data storage subsystem 300.

In response to the stimulus, the ELF 116 in step 506 generates an output message such as "CHECK-IN LIBRARY VOLUME IN LIBRARY-NAME, CARTRIDGE TYPE=3590, ACCESS=SCRATCH". This instructs the subsystem 300 that the new volume is an IBM model 3590 type tape, and is considered a "scratch" category volume. The command generator 108 sends the message to the storage controller 310 in step 508. Next, in step 510, the SANTA 106 receives an immediate-response message from the storage controller 310. In this example, the immediate-response message may be "BACKGROUND PROCESS NNNN STARTED", where "NNNN" is an identifier for the check-in process initiated in the subsystem 300. This being an immediate-response message, the command response unit 110 in step 512 routes the received message to the appropriate ELF, preferably the same ELF 116 that originated the procedure in step 506.

Following step 512, the ELF 116 in step 513 recognizes that no action is needed in response to the immediate-response message. Accordingly the ELF 116 proceeds to step 514. Recognizing that a delayed-response message is proper in this case, the ELF 116 routes control to step 516. Step 516 waits until the delayed-response message is received from the storage controller 310. This message may comprise a "BACKGROUND PROCESS NNNN SUCCEEDED" or "BACKGROUND PROCESS NNNN FAILED" message. Having received the delayed-response message, the message console 112 forwards the message to the appropriate ELF, preferably the ELF 116 that acted in step 506. In response, the ELF in step 520 takes appropriate action, such as sending a completion notification message to the ELF that originated the check-in process in step 504.

Cartridge ID

In another example, one or more ELFs may be implemented to perform a cartridge-ID function, which identifies a tape cartridge with a specified identification (ID) code. In this embodiment, the ELF 116 in step 504 detects a stimulus comprising a message from an external source 126. This stimulus is received on the input 116b of the ELF 116. In this example, the external source 126 comprises another ELF or the library manager 314, which issues a "WHAT PHYSICAL CARTRIDGE IS EXTERNAL OBJECT ID NNNN ?" message, asking the system 100 to identify a cartridge with a particular ID code.

In response to the stimulus, the ELF 116 in step 506 generates an output message such as "QUERY VOLUME USAGE EXTERNAL OBJECT ID=NNNN". This queries the subsystem 300 to determine the cartridge's ID. The command generator 108 sends the message to the storage controller 310 in step 508. In response, the storage controller 310 may, for example, consult the catalog 328 to determine the requested cartridge. Next, in step 510, the SANTA 106 receives an immediate-response message from the storage controller 310. In this example, the immediate-response message may be "OBJECT ID=ABCNNN", specifying the cartridge's label. This being an immediate-response message, the command response unit 110 in step 512 routes the received message to the appropriate ELF, preferably the same ELF 116 that acted in step 506.

Following step 512, the ELF 116 in step 513 takes not action, since none is required by the immediate-response message. In step 514, the ELF 116 recognizes that a delayed response message is not expected in this case, and routes control to step 520. In step 520, the ELF 116 recognizes that the cartridge ID has been supplied as requested, and takes appropriate action by forwarding the cartridge ID to the originating ELF or library manager 314.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for communicating with a digital data processing machine, comprising:
   receiving messages from a digital data processing machine;
   if a received message is of a first type, routing the first type message to one of a plurality of expert local facilities (ELFs) in accordance with routing criteria, each ELF performing one or more predetermined actions according to each message routed thereto;
   if a received message is of a second type, routing the second type message to one of the ELFs according to content of the second type message;
   each ELF, in response to each message routed to the ELF, performing the predetermined actions associated with the ELF, said predetermined actions including generation of an output message;
   modifying the output message into a predetermined format to create a formatted output message;
   selecting a destination in the digital data processing machine;
   dispatching the formatted output message to the selected destination; and
   determining whether a first type message is expected from the digital data processing machine in response to the dispatched formatted output message, and if so, generating routing criteria for routing the expected message to one of the ELFs configured to process the expected message.

2. The method of claim 1, the first type messages being immediate-response messages.

3. The method of claim 1, the second type messages being delayed-response messages.

4. The method of claim 1, further comprising:
   at least one of the ELFs initiating a predetermined process associated with the ELF in response to stimulus from another one of the ELFs.

5. The method of claim 1, further comprising:
   at least one of the ELFs initiating performance of a predetermined process associated with the ELF in response to expiration of a timer.

6. The method of claim 1, the digital data processing machine comprising a data storage system.

7. The method of claim 1, the ELFs being embodied by a digital data processing apparatus.

8. A method of operating a message processing system to communicate with a digital data processing machine, the message processing system comprising:
   a message director coupled to the digital data processing machine to receive messages therefrom and route each message to one of a plurality of expert local facilities (ELFs);
   the plurality of ELFs, each ELF coupled to the message director, each ELF responsive to messages routed thereto to perform predetermined actions according to the message; and
   a command generator coupled to the ELFs, to receive output messages from the ELFs, create formatted output messages by conforming received output messages into a predetermined format, and dispatch the formatted output message to a selected destination in the digital data processing machine;
   the method comprising:
   a first one of the ELFs receiving an input stimulus from an stimulus source attached thereto;
   the first ELF generating a first output message;
   the command generator receiving the output message from the first ELF, creating a first formatted output message by conforming the first output message into a predetermined format, dispatching the first formatted output message to a selected destination in the digital data processing machine;
   the command generator determining whether a first type message is expected from the digital data processing machine in response to the first formatted output message, and if so, generating routing criteria for routing the expected first type message to one of the ELFs configured to process the expected message;
   receiving a message from the digital data processing machine responsive to the first formatted output message;

if the received message is of the first type, routing the received message to one of the ELFs in accordance with the routing criteria;

if the received message is of the second type, routing the received message to one of the ELFs configured to process the received message, according to content of the received message; and in response to the received message, the ELF receiving the received message performing its predetermined actions according to the received message.

9. The method of claim 8, the stimulus source comprising a timer.

10. The method of claim 8, the stimulus source comprising a component of the digital data processing machine.

11. The method of claim 8, the stimulus source comprising a different one of the ELFs than the first ELF.

12. The method of claim 8, the first type messages comprising immediate-response messages.

13. The method of claim 8, the second type messages comprising delayed-response messages.

14. The method of claim 8, the ELF receiving the received message preparing a second output message in response thereto.

15. The method of claim 8, the method being performed by a digital computer embodying the message processing system.

16. A signal-bearing medium tangibly embodying a program of machine-readable instructions executable by a digital processing apparatus to perform a method for communicating with a digital data processing machine, said method comprising:

receiving messages from a digital data processing machine;

if a received message is of a first type, routing the first type message to one of a plurality of expert local facilities (ELFs) in accordance with routing criteria, each ELF performing one or more predetermined actions according to each message routed thereto;

if a received message is of a second type, routing the second type message to one of the ELFs according to content of the second type message;

each ELF, in response to each message routed to the ELF, performing the predetermined actions associated with the ELF, said predetermined action including generation of an output message;

modifying the output message into a predetermined format to create a formatted output message;

selecting a destination in the digital data processing machine;

dispatching the formatted output message to the selected destination; and determining whether a first type message is expected from the digital data processing machine in response to the dispatched formatted output message, and if so, generating routing criteria for routing the expected message to one of the ELFs configured to process the message.

17. The medium of claim 16, the destination in the digital data processing machine comprising an address therein.

18. The medium of claim 16, the first type messages being immediate-response messages.

19. The medium of claim 18, the second type messages being delayed-response messages.

20. The medium of claim 18, further comprising:

at least one of the ELFs initiating a predetermined process associated with the ELF in response to stimulus from another one of the ELFs.

21. The medium of claim 16, further comprising:

at least one of the ELFs initiating performance of a predetermined process associated with the ELF in response to expiration of a timer.

22. The medium of claim 16, the digital data processing machine comprising a data storage system.

23. The medium of claim 17, the ELFs being embodied by a digital data processing apparatus.

24. A signal-bearing medium tangibly embodying a program of machine-readable instructions executable by a digital processing apparatus to perform a method for operating a message processing system to communicate with a digital data processing machine, the message processing system comprising:

a message director coupled to the digital data processing machine to receive messages therefrom and route each message to one of a plurality of expert local facilities (ELFs);

a plurality of ELFs, each ELF coupled to the message director, each ELF responsive to messages routed thereto to perform predetermined actions according to the message; and a command generator coupled to the ELFs, to receive output messages from the ELFs, create formatted output messages by conforming received output messages into a predetermined format, and dispatch the formatted output message to a selected destination in the digital data processing machine;

the method comprising:

a first one of the ELFs receiving an input stimulus from an stimulus source attached thereto;

the first ELF generating a first output message;

the command generator receiving the output message from the first ELF, creating a first formatted output message by conforming the first output message into a predetermined format, dispatching the first formatted output message to a selected destination in the digital data processing machine;

the command generator determining whether a first type message is expected from the digital data processing machine in response to the first formatted output message, and if so, generating routing criteria for routing the expected first type message to one of the ELFs configured to process the expected message;

receiving a message from the digital data processing machine responsive to the first formatted output message;

if the received message is of the first type, routing the received message to one of the ELFs in accordance with the routing criteria;

if the received message is of the second type, routing the received message to one of the ELFs configured to process the received message, according to content of the received message; and in response to the received message, the ELF receiving the received message performing its predetermined actions according to the received message.

25. The medium of claim 24, the stimulus source comprising a timer.

26. The medium of claim 24, the stimulus source comprising a component of the digital data processing machine.

27. The medium of claim 24, the stimulus source comprising a different one of the ELFs than the first ELF.

28. The medium of claim 24, the first type messages comprising immediate-response messages.

29. The medium of claim 24, the second type messages comprising delayed-response messages.

30. The medium of claim 24, the ELF receiving the received message preparing a second output message in response thereto.

31. The medium of claim 24, the method being performed by a digital computer embodying the message processing system.

32. An apparatus to communicate with a digital data processing machine, comprising:
   a message director coupled to a digital data processing machine and programmed to receive messages therefrom and selectively route each message to one of a plurality of expert local facilities (ELFs), said message director routing received messages of a first type according to routing criteria received from a command generator, and routing received messages of a second type according to content of the received messages;
   the plurality of ELFs, each ELF coupled to the message director, each ELF programmed to perform one or more predetermined actions in accordance with each message routed thereto;
   a command generator coupled to the ELFs and programmed to receive output messages from the ELFs, create formatted output messages by conforming received output messages into a predetermined format, dispatch the formatted output messages to a selected destination in the digital data processing machine, and formulate routing criteria for messages of the first type expected from the digital data processing machine.

33. The apparatus of claim 32, the first type messages being immediate-response messages.

34. The apparatus of claim 32, the second type messages being delay-response messages.

35. The apparatus of claim 32, at least one of the ELFs further programmed to initiate a predetermined process associated with the ELF in response to stimulus from another one of the ELFs.

36. The apparatus of claim 32, at least one of the ELFs programmed to initiate performance of a predetermined process associated with the ELF in response to expiration of a timer.

37. The apparatus of claim 32, the ELFs being embodied by a digital data processing apparatus.

38. The apparatus of claim 32, further comprising an external source separate from the data processing machine to supply external messages to one or more of the ELFs.

39. The apparatus of claim 38, the external source comprising an interconnection between ELFs.

40. The apparatus of claim 38, the external source comprising timer.

41. The apparatus of claim 32, the command generator further being programmed to select the destination in the digital data processing machine for each formatted output message.

42. An apparatus for communicating with a digital data processing machine, comprising:
   message directing means coupled to a digital data processing machine and for receiving messages therefrom and selectively routing each message to one of a plurality of expert local facility means, said message directing means routing received messages of a first type according to routing criteria received from a command generating means, and routing received messages of a second type according to content of the received message;
   the plurality of expert logical facility means, each expert logical facility means coupled to the message directing means, in being for performing one or more predetermined actions in accordance with each messages routed thereto;
   a command generating means coupled to the expert logical facility means for receiving output messages from the expert local facility means, creating formatted output messages by conforming received output messages into a predetermined format, dispatching the formatted output messages to a selected destination and digital processing machine, and formulating routing criteria for messages of the first type expected from the digital data processing machine.

43. An automated system administrator, comprising:
   a message director coupled to a digital data processing machine to receive messages therefrom and selectively route each message to one of a plurality of expert local facilities (ELFs), the messages including immediate-response messages and delayed-response messages, the message director comprising:
      a command response unit coupled to the digital data processing machine and having a routing input, the command response unit receiving immediate-response messages from the digital data processing machine and routing each immediate-response message to one of the ELFs in response to routing criteria received at the routing input; and
      a message console coupled to the digital data processing machine to receive delayed-response messages therefrom and route the received delayed-response message one of the ELFs in accordance with content of the received delayed-response message;
   the plurality of ELFs, each ELF including one or more inputs each coupled to one or more of the following: the command response unit, the message console, a timer, and an external source, each ELF responsive to signals received at inputs thereto to perform predetermined actions according tot he received signals; and
   a command generator coupled to the ELFs and the routing input of the command response unit, the command generator:
      generating routing criteria specifying one of the ELFs for routing each received immediate-response message to, and forwarding the routing criteria to the routing input;
      receiving output messages from the ELFs and create formatted output messages by conforming received output messages into a predetermined format; and
      dispatching the formatted output message to a selected destination in the digital data processing machine.

44. A data storage subsystem, comprising:
   a data storage facility including multiple items of digital data storage media; and
   a mechanized operator coupled to the data storage facility and comprising:
      a message director coupled to a digital data processing machine and programmed to receive messages therefrom and selectively route each message to one of a plurality of expert local facilities (ELFs), said message director routing received messages of a first type according to routing criteria received from a command generator, and routing received messages of a second type according to content of the received messages;
      the plurality of ELFs, each ELF coupled to the message director, each ELF programmed to perform one or more predetermined actions in accordance with each message routed thereto;

a command generator coupled to the ELFs and programmed to receive output messages from the ELFs, create formatted output messages by conforming received output messages into a predetermined format dispatch the formatted output messages to a selected destination in the digital data processing machine, and formulate routing criteria for messages of the first type expected from the digital data processing machine.

45. The data storage subsystem of claim 44, the multiple items of digital data storage media including a plurality of magnetic data storage tapes.

46. The data storage subsystem of claim 44, the multiple items of digital data storage media including multiple magnetic data storage disks.

47. The data storage subsystem of claim 44, the data storage facility comprising a virtual tape server.

* * * * *